United States Patent [19]  [11] 3,925,454
Chibata et al.  [45] Dec. 9, 1975

[54] PREPARATION OF OPTICALLY ACTIVE ISOMERS OF LYSINES

[75] Inventors: Ichiro Chibata; Shigeki Yamada, both of Toyonaka; Masao Yamamoto, Kyoto, all of Japan

[73] Assignee: Tanabe Seiyaku Co. Ltd., Osaka, Japan

[22] Filed: Apr. 17, 1969

[21] Appl. No.: 817,148

[30] Foreign Application Priority Data
Apr. 22, 1968  Japan.............................. 43-27181
Apr. 22, 1968  Japan.............................. 43-27182

[52] U.S. Cl. ......................................... 260/501.12
[51] Int. Cl.² ...................................... C07C 143/00
[58] Field of Search ............................. 260/501.12

[56] References Cited
UNITED STATES PATENTS
3,527,776  9/1970  Uzuki et al. ................... 260/501.12

OTHER PUBLICATIONS
Stearn, Chemical Abstracts, Vol. 21, p. 1131 (1927).
Eliel, Stereochemistry of Carbon Compounds, McGraw–Hill Book Co., N.Y., N.Y., p. 48 (1962).
Stearn, J. Gen. Physiol., Vol. 10, pp. 369–377 (1926).
Stearn, J. Gen. Physiol., Vol. 10, pp. 325–336 (1926).

*Primary Examiner*—Gerald A. Schwartz
*Attorney, Agent, or Firm*—Bierman & Bierman

[57] ABSTRACT

A process is described for resolving DL-lysine p-aminobenzenesulfonate into its enantiomers. A supersaturated solution of DL-lysine p-aminobenzenesulfonate is prepared. The solution is seeded with crystals of the desired enantiomer so that the proportion of the desired enantiomer becomes greater than that of the other enantiomer. The solution is cooled and the resultant crystals are recovered from the mother liquor. An additional amount of DL-lysine p-aminobenzenesulfonate is desolved in the mother liquor at an elevated temperature to produce a solution supersaturated with respect to the other enantiomer. The solution is cooled and the resultant crystals are collected.

14 Claims, No Drawings

PREPARATION OF OPTICALLY ACTIVE ISOMERS OF LYSINES

DESCRIPTION

This invention relates to a process for the resolution of lysine p-aminobenzenesulfonate and to a process for the preparation of optically active lysines.

L-lysine is an essential amino acid having medical and nutritional properties. In contrast, D-lysine has no known medical or nutritional value. Various attempts have been made in an effort to devise a commercially applicable method for the preparation of optically active isomers of lysine by resolving synthetically prepared DL-lysine. Known methods may be divided into two groups. One is the chemical methods wherein a resolving agent is employed. The other is the biological methods wherein the action of an enzyme is employed. These methods are not ready for application to commercial production. The chemical methods are disadvantageous in that, the use of expensive resolving agents is required, there is not a sufficient difference in solubility, incomplete resolution of the diastereoisomers is afforded and occasional racemization of the resolving agent occurs. On the other hand, the biological methods necessarily require some biological procedures as for example, fermentation microorganisms, and the preparation of an enzyme. Further the biological methods involve complicated operations.

It has now been found that, when DL-lysine is converted into a salt by employing p-aminobenzenesulfonic acid, the salt has many beneficial properties which make it suitable for selectively crystallizing it into each of its optically active components. These properties are as follows: The racemic modification of lysine p-aminobenzenesulfonate is more soluble than both of the enantiomers thereof. A saturated solution of the racemic modification will not dissolve any more of the individual enantiomer. The supersaturated solution of an enantiomer is stable even after the selective crystallization of the other optically active enantiomer. Prompt crystallization of each of the enantiomers is afforded and an optically active enantiomer, i.e., D- or L-lysine p-aminobenzenesulfonate can be selectively crystallized out of a supersaturated solution of the racemic modification or from a supersaturated solution containing the racemic modification and one of the enantiomers.

An object of this invention is, therefore, to provide an economical and commercially useful process for the resolution of DL-lysine p-aminobenzenesulfonate into each of its enantiomers. The process of the present invention is free of the disadvantages of the above mentioned known methods. Further, according to the process of the present invention, the desired optically active lysine p-aminobenzenesulfonate can be obtained in a high yield and within a short period of time. Another object of this invention is to provide a novel method for the industrial production of optically active lysines derived from optically active lysine p-aminobenzenesulfonate. Other objects of this invention will be apparent from the following description and claims.

The process, according to the present invention, comprises producing a supersaturated solution of DL-lysine p-aminobenzenesulfonate in a solvent therefor; seeding or dissolving one of the optically active components thereof into the solution thus making it predominant over the other component in the solution; allowing the predominant component to crystallize out; and then recovering it from the mother liquor.

In one embodiment of the invention, a small amount of crystals of one of the enantiomers is added to the supersaturated solution as a seed and the mixture is stirred to cause selective crystallization of the enantiomer which is the same as that which was seeded. Alternatively, a small amount of one of the enantiomers is dissolved in a hot solution of the racemic modification in order to make the said enantiomer dominant over the other in the solution. The solution is then cooled whereby spontaneous crystallization of the enantiomer which is the same as that which was added takes place. It is also possible to combine these procedures. Namely, a partial amount of the crystals of one of the enantiomers is dissolved in a hot solution of the racemic modification and the remaining part is used to seed the supersaturated solution in which one of the enantiomers is dominant over the other. In this case, the seeding amount can be minimized. The supersaturated solution may be prepared from a solution of DL-lysine p-aminobenzenesulfonate in a suitable solvent by applying thereto conventional procedures as for example refrigeration, concentration, addition of appropriate solvents or a combination of these operations. For the preparation of the supersaturated solution thereof, however, it is most convenient to cool a hot solution saturated with DL-lysine p-aminobenzenesulfonate, as the solubility thereof increases with an increase in the temperature. The preferred proportion of the seed to be added is about 0.1 percent by weight of the solution. However, it should be noted that the greater the amount of the seed, the better the resultant resolution. If the solution already containes an optically active enantiomer dominant over its antipode because of the natural occurence of the seed crystals, the need for seeding with seed crystals of the optical enantiomer which is dominant over the other is obviated. Nevertheless, for smooth resolution seeding is preferred. Although the temperature at which the crystallization is carried out is not critical for the method of the invention, a temperature of about room temperature is preferred. The crystallization is enhanced and made smoother by stirring the solution. Any inert solvent which can dissolve DL-lysine p-aminobenzenesulfonate and which can crystallize out the compound as a conglomerate is suitable in the process of the selective crystallization. Water, aqueous solvent, for example, a solution containing alkanols having up to 6 carbon atoms or a alkanone having up to 6 carbon atoms are suitable for this purpose. From an industrial standpoint water is the most suitable solvent.

After one of the optically active enantiomers has been crystallized out and separated from the mother liquor, the other enantiomer remaining in said mother liquor becomes dominant over the enantiomer which was crystallized out. This mother liquor may be again employed for the optical resolution of the other enantiomer. For this purpose in order to produce the original concentration of the enantiomorphic mixture, the mother liquor is concentrated. Alternatively, a quantity of the racemic modification, which quantity is preferably equal to the amount of the enantiomer previously separated, may be dissolved in the mother liquor. The procedure which was carried out in the previous operation is then repeated to separate out the other enantiomer. Thus the cycle of the operation may be repeated indefinitely, whereby the racemic modification supplied may be successively and entirely resolved into each of D- and L-lysine p-aminobenzenesulfonates. The resulting crystals thus obtained may sometimes be optically impure due to the degree of supersaturation and the amount of crystallization. The crude crystals, however, may be easily purified, because the solubility of the racemic modification is higher than that of each enantiomer and the said enantiomer will not dissolve in the saturated solution of the racemic modification. Namely, crystals having 100 percent optical purity can be recovered by immersing crude crystals in a sufficient quantity of a solvent which will dissolve the racemic modification in the optically crude crystals, allowing the said enantiomer to crystallize out and then recovering it from the solution. Such operations as refrigeration, concentration, the addition of a solvent or combinations thereof may be applied for crystallization of the optically active enantiomer from the solution, and any inert solvents which are described above may also be used for this purpose.

The physical property (M.p., specific rotation and solubility) of DL-, L- or D-lysine p-aminobenzenesulfonate are shown in the following Table 1.

Table 1

| Lysine p-amino-benzene-Sulfonate | M.p. (decomp) | Specific rotation (C-2, 1N-HCl) | Solubility * 25°C. | 45°C. |
|---|---|---|---|---|
| DL-form | 239°C. | 0 | 66.1 | 90.6 |
| L-form | 251°C. | +11.65° | 42.7 | 63.1 |
| D-form | 251°C. | −11.65° | 42.7 | 63.1 |

*g./100 g. of water

Furthermore, an optically active lysine p-aminobenzenesulfonate thus obtained can be easily racemized by heating the aqueous solution of the enantiomer. To carry out the reaction smoothly, it is necessary to heat the solution at least over 130°C.; however, it is not practical to operate at too high a temperature, i.e., over 210°C., because decomposition of the salt may occur. Therefore, the preferred reaction temperature ranges from about 140° - 190°C. The preferred amount of water to be used is about 1/3 - 10 times the amount of the enantiomer. An excess amount of water is disadvantageous for it decreases the speed of racemization.

On the other hand, the amount of the enantiomer to be added to water is not restricted in the extent which is smaller than the amount corresponding to the solubility thereof at the reaction temperature. Namely, the racemization can also be carried out even though a portion of the isomer is not dissolved in the solution, this is so because said insoluble portion is gradually dissolved and subjected to the racemization as the conversion of the dissolved part of the isomer into the racemic modification takes place. The racemic modification thus produced can be recovered from the solution by a conventional manner and is again employed as the starting material for the present invention. Thus, DL-lysine p-aminobenzenesulfonate can be converted into the desired optically active enantiomer by combining alternatively the resolution and the racemization of the present invention.

Optical enantiomers of free lysine can be obtained from optically active lysine p-aminobenzenesulfonates without racemization by treating with an acid or acidic ion-exchange resin and liberating the resultant optically active lysines. DL-lysine p-aminobenzensulfonate, a starting compound of the present invention is a novel compound, which can be prepared by neutralizing DL-lysine with p-aminobenzenesulfonic acid in a solvent.

Practical embodiments of the present invention are illustrated in the following Examples.

EXAMPLE 1

16.5 g. of DL-lysine p-aminobenzenesulfonate are dissolved in 20 ml. of water with the aid of heat. The solution is then cooled to 25°C. One g. of L-lysine p-aminobenzenesulfonate is seeded into the solution. The mixture is stirred for 12 minutes at the same temperature and the resulting crystals are collected by filtration. The crystals are washed with 60 percent (V/V) methanol and dried whereby 2.7 g. of L-lysine p-aminobenzenesulfonate are obtained.

$[\alpha]_D^{30} = +11.65°$ (C = 2, 1N - HCl)
Optical purity: 100 percent

EXAMPLE 2

42.0 g. of DL-lysine p-aminobenzenesulfonate and 2.5 g. of L-lysine p-aminobenzenesulfonate are dissolved in 50 ml. of water with the aid of heat. The solution is then cooled to 25°C. 0.2 g. of L-lysine p-aminobenzenesulfonate is seeded into the solution. The mixture is stirred for 25 minutes at the same temperature and the resulting crystals are collected by filtration. The crystals are washed and dried in the same manner as described in Example 1 whereby 7.0 g. of L-lysine p-aminobenzenesulfonate are obtained.

$[\alpha]_D^{30} = +11.50°$ (C - 2, LN - HCl)
Optical purity: 98.7 percent

EXAMPLE 3

38.5 g. of DL-lysine p-aminobenzenesulfonate and 2.5 g. of D-lysine p-aminobenzenesulfonate are dissolved in 50 ml. of water by heating at 70°C. and then cooled to 25°C. 50 mg. of D-lysine p-aminobenzenesulfonate is seeded into the solution. The mixture is stirred for 65 minutes at the same temperature and the resulting crystals are collected by filtration. The crystals are washed and dried in the same manner as described in Example 1 whereby 5.9 g. of D-lysine p-aminobenzenesulfonate are obtained.

$[\alpha]_D^{30} = -11.45°$ (C - 2, LN - HCl)
Optical purity: 98.3 percent

To the mother liquor obtained after isolation of D-lysine p-aminobenzenesulfonate, there are added 5.7 g. of DL-lysine p-aminobenzenesulfonate, and the mixture is heated until solution is complete. The solution is cooled to 25°C., seeded with 50 mg. of L-lysine p-aminobenzenesulfonate and then stirred for 65 minutes at the same temperature. The resulting crystals are treated in the same manner as described in Example 1 whereby 5.6 g. of L-lysine p-aminobenzenesulfonate are obtained.

$[\alpha]_D^{30} = +11.65°$ (C = 2, LN - HCl)
Optical purity: 100 percent 3.20 g. of the crystals are dissolved in 2.5 ml. of water with the aid of heat. 2.5 ml. of 6N-hydrochloric acid are added dropwise to the lukewarm solution, at which time, p-aminobenzenesulfonic acid is liberated as a precipitate. The solution is allowed to stand overnight in a refrigerator and the resulting crystals of p-aminobenzenesulfonic acid are filtered off. Enough water is added to the filtrate to bring the total volume to 40 ml. The solution is passed through a column of 20 ml. of an ion-exchange resin (Amberlite IR-120 H-form). The column is washed with 50 ml. of 1N-hydrochloric acid and water. Then it is eluted with 1N-aqueous ammonia. The eluate is concentrated to remove ammonia. The pH of the residual solution is adjusted to pH 4.5 with N-hydrochloric acid. The solution is then concentrated to dryness and the residue thus obtained is washed with ethanol whereby 1.69 g. of L-lysine hydrochloride are obtained.

$[\alpha]_D^{25} = +20.8°$ (C = 2, 5N - HCl)

EXAMPLE 4

15.4 g. of DL-lysine p-aminobenzenesulfonate and 1.0 g. of L-lysine p-aminobenzenesulfonate are dissolved in 20 ml. of water with the aid of heat. The solution is cooled to 25°C and then stirred for 45 minutes at the same temperature without seeding. The resulting crystals are collected by filtration whereby 2.0 g. of L-lysin p-aminobenzenesulfonate are obtained.

$[\alpha]_D^{30} = +11.2°$ (C = 2, 1N - HCl)
Optical purity: 96.1 percent

EXAMPLE 5

5.0 g. of DL-lysine p-aminobenzenesulfonate and 0.20 g. of D-lysine p-aminobenzenesulfonate are dissolved in 50 ml. of 60 percent (V/V) aqueous ethanol with the aid of heat. The solution is then cooled to 25°C. 50 mg. of D-lysine p-aminobenzenesulfonate is seeded into the solution. The mixture is allowed to stand for 4½ hours at the same temperature and the resulting crystals are collected by filtration whereby 0.43 g. of D-lysine p-aminobenzenesulfonate is obtained.

$[\alpha]_D^{30} = -11.6°$ (C = 2, 1N - HCl)
Optical purity: 99.6 percent

EXAMPLE 6

7.50 g. of DL-lysine p-aminobenzenesulfonate and 0.40 g. of L-lysine p-aminobenzenesulfonate are dissolved in 50 percent (V/V) aqueous acetone by heating and cooled to 25°C. 0.10 g. of L-lysine p-aminobenzenesulfonate is seeded into the solution. The mixture is stirred for 25 minutes at the same temperature and the resulting crystals are collected by filtration whereby 1.24 g. of L-lysine p-aminobenzenesulfonate is obtained.

$[\alpha]_D^{30} = +10.3°$ (C = 2, 1N - HCl)
Optical purity: 88.4 percent

EXAMPLE 7

10.0 g of L-lysine p-aminobenzenesulfonate (optical purity: 74.2 percent) are added to a mixture of 20 ml. of the aqueous solution saturated (at 25°C.) with DL-lysine p-aminobenzenesulfonate and 3.9 ml. of water. The mixture is then heated until solution is complete. After cooling to 25°C., the solution is stirred for 2 hours. The resulting crystals are collected by filtration. The crystals thus obtained are washed with a small amount of 60 percent aqueous methanol and dried whereby 7.4 g. of L-lysine p-aminobenzenesulfonate are obtained.

$[\alpha]_D^{30} = +11.65°$ (C = 2, 1N -HCl)
Optical purity: 100 percent

EXAMPLE 8

10.0 g. of D-lysine p-aminobenzenesulfonate (optical purity: 80.7 percent) are mixed with 32 ml. of 60 percent (V/V) aqueous methanol and heated at 50°C. to dissolve a partial amount of the crystals. The mixture is then stirred for 1 hour at 25°C. The crystals are collected by filtration, washed with a small amount of 60 percent (V/V) aqueous methanol and dried whereby 8.0 g. of D-lysine p-aminobenzenesulfonate are obtained. The optical purity of the crystals is 100 percent.

EXAMPLE 9

10.0 g. of L-lysine p-aminobenzenesulfonate (optical purity: 78.9 percent) are mixed with 22.2 ml. of 50 percent (V/V) aqueous methanol and the mixture is stirred for 3 hours at 25°C. The crystals are collected by filtration, washed with a small amount of 50 percent (V/V) aqueous ethanol and dried whereby 7.8 g. of L-lysine p-aminobenzenesulfonate are obtained. The optical purity of the crystals is 100 percent.

EXAMPLE 10

30.0 g. of L-lysine p-aminobenzenesulfonate are added to 10 ml. of distilled water. The mixture containing a part of the crystals which has not been dissolved is heated at 145°C. for 8 hours in a sealed tube. The mixture is then heated an additional 12 hours. After condensation of the reaction mixture, the residue is washed with ethanol to yield 29.0 g. of DL-lysine p-aminobenzenesulfonate. M.p. 237°C. (decomp.)

$[\alpha]_D^{25} = 0.0°$ (C = 4 in $H_2O$)

The degree of racemization is 100 percent

EXAMPLE 11

25.0 g. of L-lysine p-aminobenzenesulfonate are added to 10 ml. of distilled water. The mixture is heated at 145°C. for 6 hours whereby a solution exhibiting a specific rotation of $[\alpha]_D^{25} = +3.1°$ (C=4, in $H_2O$) is obtained. The degree of racemization of said optical enantiomer is 48 percent in the solution. 8.2 ml. of water are added to the solution. The solution is stirred vigorously at 25°C. for an additional hour then the crystals are filtered off. The filtrate is condensed to dryness. The residue thus obtained is washed with ethanol to yield 11.9 g. of DL-lysine p-aminobenzenesulfonate.

M.p. 238°C. (decomp.) $[\alpha]_D^{25} = 0.0°$ (C=4, in $H_2O$)

What we claim is:

1. A process for resolving DL-lysine-p-aminobenzenesulfonate comprising the steps of preparing a supersaturated solution of DL-lysine-p-aminobenzenesulfonate in an inert solvent selected from the group consisting of water, a mixture of water and a alkanone having up to 6 carbon atoms, a mixture of water and an alkanol having up to 6 carbon atoms, and an alkanol having up to 6 carbon atoms; adding crystals of the desired enantiomer of the DL-lysine-p-aminobenzenesulfonate to cause crystallization of the desired enantiomer to take place, and recovering the separated crystals.

2. A process as claimed in claim 1 in which the desired enantiomer is dissolved in a solution of the racemic modification at an elevated temperature and the solution is allowed to cool to produce said supersaturated solution.

3. A process as claimed in claim 1 in which the desired enantiomer is dissolved in a solution of the racemic modification at an elevated temperature, the solution is allowed to cool and is inoculated with an additional quantity of the desired enantiomer as seed crystals.

4. A process as claimed in claim 1 in which the amount of the seed crystals added is about 0.1 percent by weight based on the weight of the solution.

5. A process as claimed in claim 1 in which an additional amount of racemic modification is dissolved with the aid of heat in mother liquor obtained after the recovery of crystals of the desired enantiomer, to pro duce a solution supersaturated with respect to said other enantiomer, the solution supersaturated with respect to said other enantiomer is cooled to allow crystallization to take place and the crystals are recovered.

6. A process as claimed in claim 5, wherein said process is repeated a plurality of times whereby said desired enantiomer and said other enantiomer are successively and alternately separated from the said racemic modification.

7. A process as claimed in claim 5 further including the step of heating an aqueous solution of one of the optically active enantiomers thus obtained to produce the racemic modification.

8. A process as claimed in claim 6 further including the step of heating an aqueous solution of one of the optically active enantiomers thus obtained to produce the racemic modification.

9. A process as claimed in claim 7 in which racemization is carried out at 130° – 210°C.

10. A process as claimed in claim 8 in which racemization is carried out at 130° – 210°C.

11. A process for resolving DL-lysine-p-aminobenzenesulfonate comprising the steps of preparing a supersaturated solution of DL-lysine-p-aminobenzenesulfonate in water, contacting the supersaturated solution with crystals of the desired enantiomer of the DL-lysine-p-aminobenzenesulfonate to cause crystallization of the desired enantiomer to take place, and recovering the separated crystals.

12. A crystalline racemic mixture of DL-lysine p-aminobenzenesulfonate.

13. A crystalline salt of D-lysine with p-aminobenzenesulfonic acid.

14. A crystalline salt of L-lysine with p-aminobenzenesulfonic acid.

* * * * *